United States Patent [19]
Maury et al.

[11] Patent Number: 4,955,986
[45] Date of Patent: Sep. 11, 1990

[54] METHOD FOR THE HEAT TREATMENT OF FINELY GRANULAR MATERIAL

[75] Inventors: Hans-Dietmar Maury, Ahlen; Wolfgang Buslowski, Ennigerloh, both of Fed. Rep. of Germany

[73] Assignee: O&K Orenstein & Koppel Aktiengesellschaft, Dortmund, Fed. Rep. of Germany

[21] Appl. No.: 867,644

[22] Filed: May 28, 1986

[30] Foreign Application Priority Data
Jun. 4, 1985 [DE] Fed. Rep. of Germany ....... 3520058

[51] Int. Cl.$^5$ .............................................. F27B 15/00
[52] U.S. Cl. ........................................ 432/14; 432/58; 432/106
[58] Field of Search ........................... 432/14, 58, 106

[56] References Cited
U.S. PATENT DOCUMENTS

| | | | |
|---|---|---|---|
| 4,402,667 | 9/1983 | Goldmann | 432/14 |
| 4,457,705 | 7/1984 | Ramesohl et al. | 432/106 |
| 4,470,849 | 9/1984 | Abelitis et al. | 432/106 |
| 4,492,566 | 1/1985 | Kreft | 432/14 |
| 4,514,170 | 4/1985 | Kupper | 432/106 |
| 4,579,526 | 4/1986 | Kreft | 432/106 |

Primary Examiner—Henry C. Yuen
Attorney, Agent, or Firm—Martin A. Farber

[57] ABSTRACT

A method for the heat treatment of finely granular material, particularly for the manufacture of cement, employs a preferably multi-stage cyclone preheater (2), a rotary tubular kiln (1), a cooler (6) and a kiln off-gas line (5) which is formed between rotary tubular kiln (1) and cyclone preheater (2). The off-gas lines provides a passage substantially in upward direction for the off-gases of the rotary tubular kiln (1) and receives tertiary air fed thereto for the combustion of additional fuel. The tertiary air is provided in two streams from the cooler (6), which cooler is connected behind the rotary tubular (1) on the material side, the streams being introduced into the kiln off-gas line (5) at different heights. In order to separate the combustion of the additional fuel from the precalcination and to avoid the production of injurious nitrogen oxides ($NO_x$), the additional fuel is fed exclusively to the lower partial stream of the tertiary air in such a manner that sub-stoichiometric combustion take place before the entrance of the second partial stream of tertiary air. The second partial stream of tertiary air effects a complete combustion of the additional fuel in the upper part of the kiln off-gas line (5).

3 Claims, 2 Drawing Sheets

METHOD FOR THE HEAT TREATMENT OF FINELY GRANULAR MATERIAL

BACKGROUND OF THE INVENTION

The present invention relates to a method for the heat treatment of finely granular material, in particular for the manufacture of cement, having a preferably multistage cyclone preheater, a rotary tubular kiln, a cooler, as well as a kiln off-gas line which is formed between the rotary tubular kiln and the cyclone preheater and is flown through substantially in upward direction by the off-gases of the rotary tubular kiln and to which tertiary air for the burning of an additional fuel is fed from the cooler, arranged on the material side behind the rotary tubular kiln, in two individual streams which are introduced at different heights into the kiln off-gas line.

A method of the type described above for the heat treatment of finely granular cement, for instance cement, lime, gypsum, dolomite, magnetite and other minerals which are to be thermally treated using different equipment is known. While in the one case the material to be treated flows in the same direction downward over the entire height through the precalcination zone formed by the kiln off-gas line as the off-gases coming from the rotary tubular kiln so that a very long heat treatment zone results, in another installation the material to be treated is fed to the rotary tubular kiln in countercurrent via the kiln off-gas line which forms a short precalcination zone. In this case, the kiln off-gas line is developed as a shaft of relatively large diameter from the upper part of which only the kiln off-gases emerge for further conveyance to the cyclone preheater.

For the carrying out of the precalcination there are used, in addition to the kiln off-gases of the rotary tubular kiln, also hot gases which come from the combustion by means of tertiary air of an additional fuel and which are withdrawn from the cooler arranged behind, with respect to the material, the rotary tubular kiln. In this connection it is known to feed the tertiary air either separately from the additional fuel to the lower end of the kiln off-gas line which forms the precalcination zone or to effect the combustion of the additional fuel by means of the tertiary air directly in front of the common entrance thereof into the kiln off-gas line, in which case there is the possibility of connecting a plurality of tertiary air lines at different heights to the kiln off-gas line and of feeding the corresponding proportion of additional fuel to each tertiary air line.

The known method with combustion of the additional fuel and precalcination taking place in the same direction of flow has various disadvantages. Since the calcination time is much shorter than the burnout time of the fuel and the oxygen partial pressure is drastically reduced by the mixing of tertiary air and kiln off-gas so that an additional increase in the burnout time is produced, considerable discrepancies arise upon unidirectional flow between combustion process and precalcination. These discrepancies are increased by the fact that, as a result of the simultaneous combustion and precalcination, $CO_2$ is liberated from the thermal decomposition and further dilutes the concentration of the oxygen, thus further lengthening the burnout time.

Another disadvantage of the unidirectional flow process is that the alkalis and halogens liberated are transported together with the off-gases, into the cyclone preheater where they can lead to a clogging of the cyclone as a result of condensation and mineralization. This can be avoided, to be sure, by a suitably large partial gas discharge which extends parallel to the preheater but this means high heat losses.

The disadvantages described above are avoided in the known counter-flow method. In particular, in this known method the alkalis and halogens are retained in the kiln circuit, where they condense on the precalcined material fed to the rotary tubular kiln. As a result, a bypass system for the kiln off-gases is necessary only when there are very high contents of injurious substance.

However, both the unidirectional flow method and the counter-flow method have the disadvantage that the desired complete combustion of the additional fuel by means of the tertiary air fed from the cooler in the kiln off-gas line extending between rotary tubular kiln and cyclone preheater is prevented by the calcination which takes place at the same time and at the same place since this calcination process excludes the occurrence of temperatures of more than 820° to 840° C. If in the known methods the calcining was separated from the combustion of the additional fuel, high temperatures of more than 1600° C. would be produced. At these temperatures, NO is formed in the off-gases and, upon the subsequent cooling of the gases, reacts with the excess of oxygen which is present for the complete combustion of the additional fuel, thus giving rise to injurious nitrogen oxides. These environment-contaminating nitrogen oxides ($NO_x$) could be removed only by an expensive off-gas purification.

SUMMARY OF THE INVENTION

The object of the present invention is to further develop the above-described method for the heat treatment of finely granular material while retaining the advantages of the counter-flow method in the manner that the precalcination takes place with the slightest possible consumption of energy even in case of the use of low-grade fuels without danger of the occurrence of injurious substances and, in particular, poisonous nitrogen oxides, so that while obtaining high thermal efficiency it is possible to dispense with expensive after-treatment of the kiln off-gases.

This objective is achieved by the invention in the manner that the additional fuel is so conducted exclusively to the lower partial stream of the tertiary air that sub-stoichiometric combustion takes place before the entrance of the second partial stream of tertiary air, that the second partial stream of tertiary air effects complete combustion of the additional fuel in the upper part of the kiln off-gas line, and that the material to be treated, after the end of the complete combustion of the additional fuel, is fed to the kiln off-gas line above the second partial stream of the tertiary air.

In the method of the invention, the combustion of the additional fuel is separated from the precalcination so that these two processes can be carried out in accordance with the thermodynamic and chemical-mineralogical requirements. The precalcination process takes place without being affected by the combustion of the additional fuel in the upper part of the kiln off-gas line, i.e. the actual precalcination zone. Since the calcination time is very much shorter than the burnout time of the additional fuel, the space to be made available for the precalcination zone in the kiln off-gas line can be reduced. The burnout time of the additional fuel is also shortened by the separation of the combustion process from the precalcination, in which connection, in accordance with the invention, incomplete combustion is initially effected. By this initially merely incomplete combustion of the additional fuel, no nitrogen oxide (NO) is produced in the kiln off-gas line so that the subsequent occurrence of injurious nitrogen oxides ($NO_x$) is prevented. Since the remaining tertiary air necessary for the complete combustion is fed in the upper part of the kiln off-gas line but below the feed of the material to be treated, the entire energy of the additional fuel is available in the upper part of the kiln off-gas line, so that an excellent precalcination which is completely separated from the combustion process takes place within a short time.

In accordance with another feature of the invention, the precalcined material coming from the last stage of the cyclone preheater is fed to the lower part of the kiln off-gas line below the partial stream of tertiary air which is laden with additional fuel. The precalcined material thus drops in the lower part of the kiln off-gas line in countercurrent to the kiln off-gas containing the volatile injurious substances from the rotary tubular kiln so that at least a part of these injurious substances are condensed on the precalcined material. The injurious substances can thus neither precipitate on the particles of the additional fuel and prevent the burning out, nor enter into the cyclone preheater through the kiln off-gas line.

BRIEF DESCRIPTION OF THE DRAWINGS

One illustrative embodiment of a plant intended for the carrying out of the method of the invention is shown in the drawing, in which.

DETAILED DESCRIPTION OF THE PREFERRED EMBODIMENTS

Figure 1:
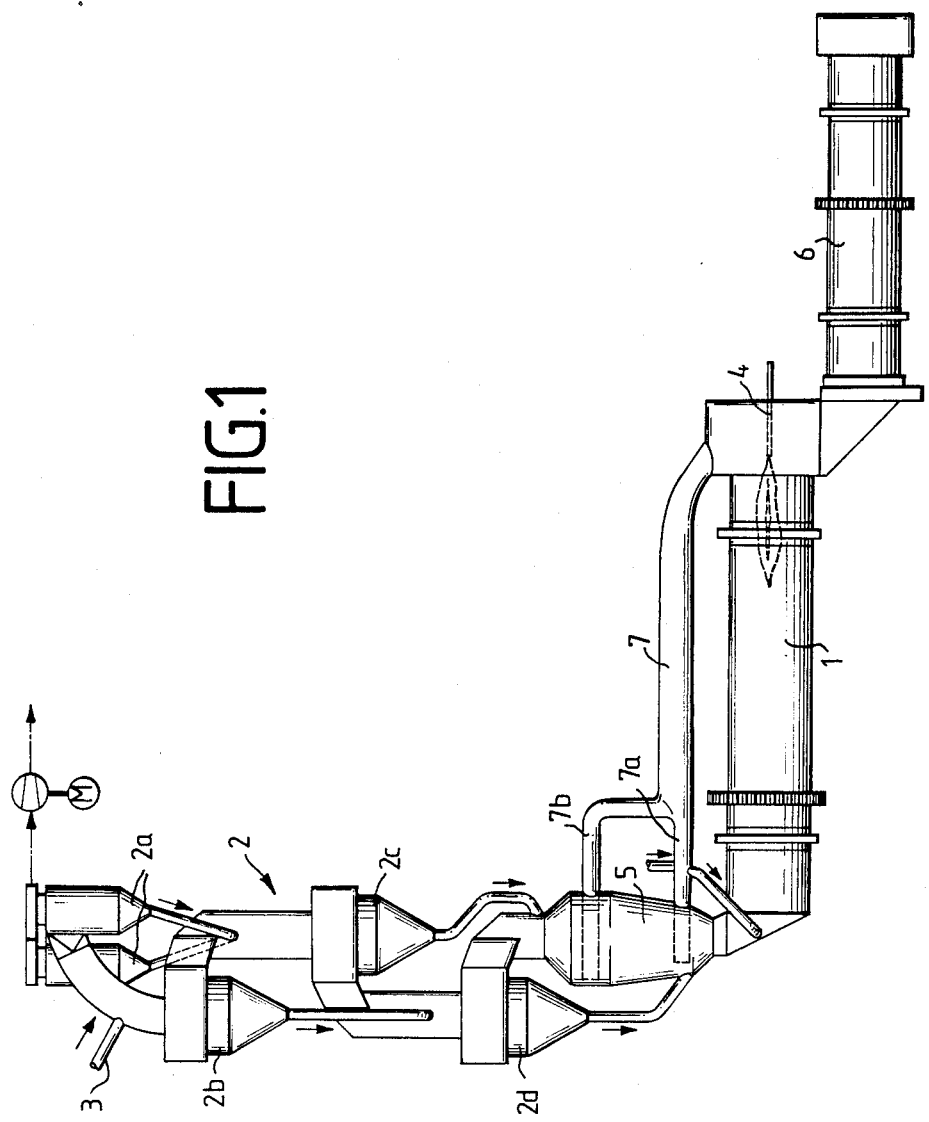
FIG. 1 is a diagrammatic overall view of the plant.

The plant for the heat treatment of finely granular material shown in FIG. 1 comprises a rotary tubular kiln 1 and a multi-stage cyclone preheater 2 to which the finely granular material to be treated is charged through a feed hopper 3. In the example shown, the first stage of the cyclone preheater 2 consists of two cyclones 2a which are connected in parallel and behind which, as second stage, there is a suitably dimensioned cyclone 2b. From this cyclone 2b the material which has already been preheated passes into a cyclone 2c which thus forms the third stage and behind which a cyclone 2d is connected as fourth stage.

The rotary tubular kiln 1 which is provided with a suitable drive is heated by main fuel which is fed, with the addition of primary air, through the main burner 4. The kiln off-gases leave the rotary tubular kiln 1 on the opposite end through a kiln off-gas line 5 developed as a shaft within which precalcination of the material to be treated takes place and which introduces the kiln off-gases into the last cyclone 2d of the multi-stage cyclone preheater 2.

Figure 2:
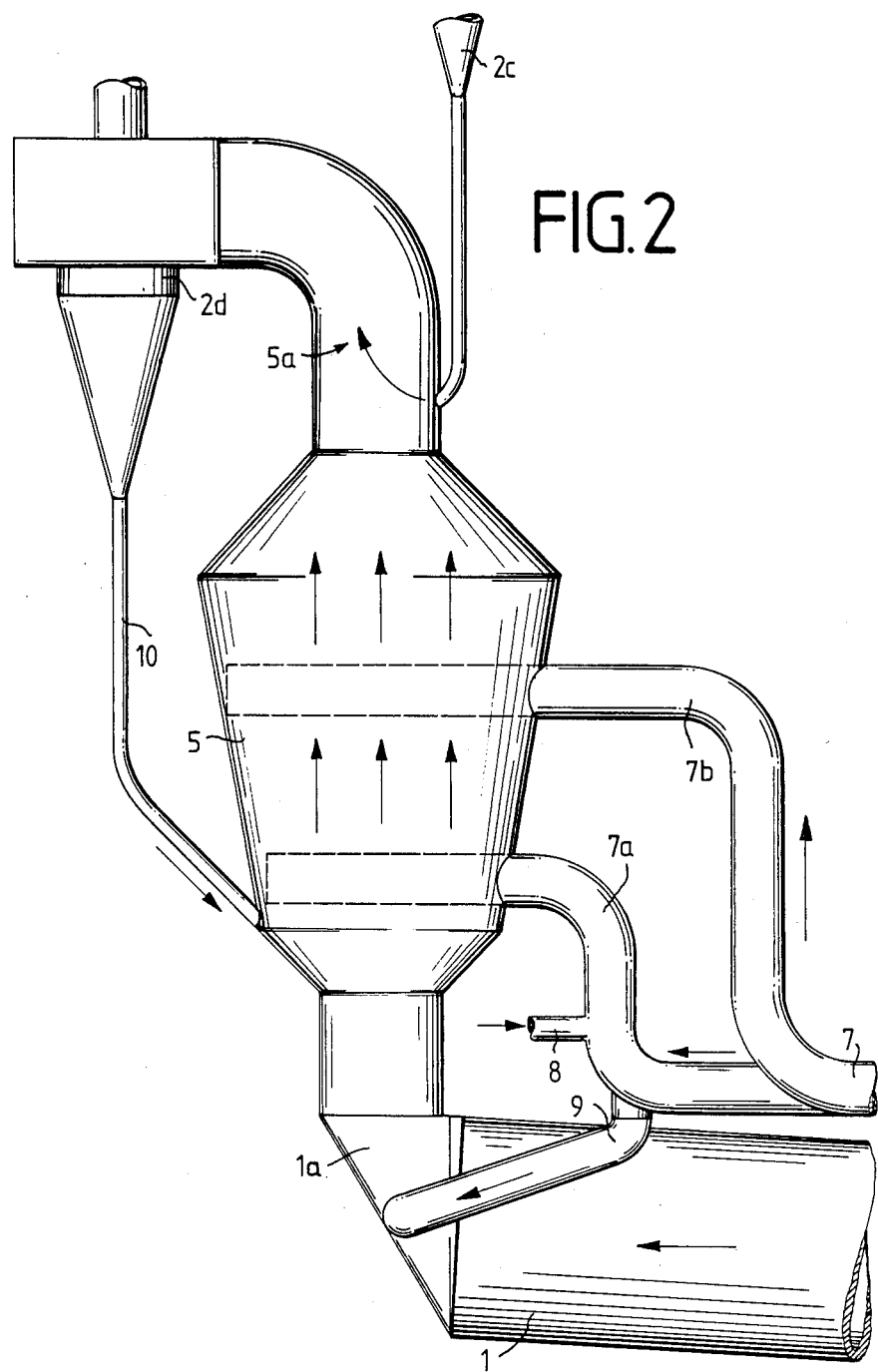
FIG. 2 is a showing, on a larger scale, of the kiln off-gas line with the connections necessary for explaining the precalcination process.

The material treated in the rotary tubular kiln 1 passes, after emergence from the rotary tubular kiln 1, into a cooler 6 which, in the embodiment shown, is again developed in the manner of a rotary tube with suitable drive. From this cooler 6, air, referred to as secondary air, which has been heated upon the cooling of the treated material is fed to the rotary tubular kiln 1. A part of this secondary air is branched off and fed in parallel to the rotary tubular kiln 1. This air which is heated upon the cooling process of the treated material is referred to as tertiary air and is fed through a tertiary air line 7 to the kiln off-gas line 5. As shown in FIG. 1, this tertiary air line 7 branches in front of the kiln off-gas line 5 into the air lines 7a and 7b which are connected at different heights to the kiln off-gas line 5. As shown in FIGS. 1 and 2, the kiln off-gas line is enlarged in diameter at the junctions with the air lines 7a and 7b.

The precalcination of the material preheated in the cyclone preheater 2 before it enters the rotary tubular kiln 1 will now be described with reference to the partial view of the plant shown on a larger scale in FIG. 2.

In order to carry out this precalcination which takes place in the upper part of the kiln off-gas line 5, additional fuel, the feed line 8 for which is shown in FIG. 2, is fed to the air line 7a which discharges in the lower part of the kiln off-gas line 5. The said feed line 8 is arranged so far in front of the mouth of the air line 7a in the kiln off-gas line 5 that the combustion process is already substantially complete before the combustion gases enter the kiln off-gas line 5. The ratio of tertiary air flowing through the air line 7a to additional fuel fed by the feed line 8 is so selected that sub-stoichiometric combustion takes place. The gases, which enter accordingly without excess oxygen into the kiln off-gas line 5, reach a temperature of between 1100° and 1300° C. Due to the temperature which lies sufficiently below the critical temperature of 1600° C. and due to the absence of excess oxygen the production of nitrogen oxide (NO) is avoided. The length of the burning path in the air line 7a is adapted to the burnout time of the additional fuel. When solid fuel is used and as a function of the slags produced thereby a slag outlet 9 is provided. The slag can either be discharged into a slag receiver (not shown) or into the kiln entrance chamber 1a, as shown in FIG. 2.

The kiln off-gases, indicated by an arrow, pass via the kiln inlet 1a from below into the kiln off-gas line 5 and mix with the off-gases of the incomplete combustion of the additional fuel from the air line 7a.

The second part of the tertiary air is fed, designated by an in FIG. 2, to this off-gas mixture through the air line 7b in the upper part of the kiln off-gas line 5. In the upper part of the kiln off-gas line 5 complete combustion of the additional fuel thus takes place. The off-gases indicated by three arrows in the upper part of the kiln off-gas line 5 thus contain the entire energy of the additional fuel without the critical temperature of 1600° C. being reached by the combustion thereof. The occurrence of nitrogen oxide (NO) is thus reliably avoided. The combustion of the additional fuel furthermore takes place without being impeded by the material to be treated, so that the combustion process can be controlled in the desired manner.

In accordance with FIG. 2, the preheated material emerging from the cyclone 2c of the third stage is introduced into the hot off-gases in the upper part of the kiln off-gas line 5. This introduction takes place within a region of the kiln off-gas line 5 having a reduced cross section of flow so that the velocity of flow of the hot off-gases which is increased thereby carries the material along and feeds it to the cyclone 2d of the fourth stage of the cyclone preheater 2. By the action of the hot off-gases on the material, there is obtained a purposeful precalcination which is separated from the combustion process of the additional fuel and is concluded, due to the very short calcination time, before the material enters into the cyclone 2d. The precalcination zone 5a is thus formed by the upper part of narrowed cross section of the kiln off-gas line 5.

Within the cyclone 2d, the preheated precalcined material is separated from the kiln off-gases and fed via the material line 10 to the lower part of the kiln off-gas line 5, namely below the mouth of the air line 7a, as indicated by a solid-line arrow in FIG. 2. In this region the kiln off-gas line also has its cross section of flow reduced. In this way the material dropping down in countercurrent to the kiln off-gases comes into intimate contact with the kiln off-gases so that the alkalis and halogens contained in the latter condense on the finely granular material and in this way are kept to the greater part from entering into the upper part of the kiln off-gas line 5 and thus into the cyclone preheater 2. The cyclone preheater 2 is thus substantially protected from condensation and mineralization of the alkalis and halogens produced upon the burning of the material in the rotary tubular kiln 1.

We claim:

1. A method for the heat treatment of finely granular material, particularly for the production of cement, with a preferably multi-stage cyclone preheater, a rotary tubular kiln, a cooler as well as a single kiln off-gas line which is formed between rotary tubular kiln and cyclone preheater and is flow through substantially in upward direction by the off-gasses of the rotary tubular kiln and to which tertiary air is fed in two partial streams for the combustion of an additional fuel from the cooler arranged behind the rotary tubular kiln on the material side, said streams being introduced at different heights into the kiln off-gas line; the method comprising the steps of:

feeding the additional fuel exclusively to the lower partial stream of the tertiary air to provide for sub-stoiciometric combustion in the off-gas line before the entrance of the second partial stream of tertiary air; feeding the second partial stream of the tertiary air to affect a complete combustion of the additional fuel in the upper part of the kiln off-gas line; and directing the material to be treated, after the conclusion of the complete combustion of the additional fuel, to the kiln off-gas line above the second partial stream of tertiary air.

2. A method according to claim 1, further comprising a step of applying the precalcined material coming from the last stage of the cylcone preheater in countercurrent to the lower part of the kiln off-gas line below the partial stream of tertiary air which is charged with additional fuel.

3. A method according to claim 1, further comprising a step of enlarging the diameter of a portion of the kiln off-gas line at the junctions with the two streams of tertiary air.

* * * * *